(12) United States Patent
England

(10) Patent No.: US 6,182,144 B1
(45) Date of Patent: Jan. 30, 2001

(54) MEANS AND METHOD FOR SWITCHING BETWEEN A NARROW BAND COMMUNICATION AND A WIDE BAND COMMUNICATION TO ESTABLISH A CONTINUOUS CONNECTION WITH MOBILE COMPUTERS

(75) Inventor: David England, Chandler, AZ (US)

(73) Assignee: Intel Corporation, Santa Clara, CA (US)

(*) Notice: Under 35 U.S.C. 154(b), the term of this patent shall be extended for 0 days.

(21) Appl. No.: 08/989,837

(22) Filed: Dec. 12, 1997

(51) Int. Cl.[7] ..................................... G06F 13/00
(52) U.S. Cl. ................ 709/232; 709/238; 709/203
(58) Field of Search .................. 395/200.68, 200.33, 395/200.36, 200.37, 200.62, 200.69, 200.49; 709/238, 203, 206, 207, 232, 239, 219

(56) References Cited

U.S. PATENT DOCUMENTS

| | | | |
|---|---|---|---|
| 4,763,317 | * 8/1988 | Lehman et al. ........................ | 370/58 |
| 5,600,633 | * 2/1997 | Jaisingh et al. ....................... | 370/277 |
| 5,600,707 | * 2/1997 | Miller, II ................................ | 379/59 |
| 5,675,507 | * 10/1997 | Bobo, II ............................. | 364/514 R |
| 5,754,961 | * 5/1998 | Serizawa et al. ..................... | 455/517 |
| 5,781,737 | * 7/1998 | Schmidt ........................... | 395/200.54 |
| 5,790,800 | * 8/1998 | Gauvin et al. ................... | 395/200.57 |
| 5,794,250 | * 8/1998 | Carino, Jr. et al. .................. | 707/104 |
| 5,850,517 | * 12/1998 | Verkler et al. .................. | 395/200.32 |

* cited by examiner

*Primary Examiner*—Zarni Maung
(74) *Attorney, Agent, or Firm*—Blakely, Sokoloff, Taylor & Zafman LLP

(57) ABSTRACT

A computer-implemented method for maintaining a continuos communication channel between a first device and a second device. The communication maintained by a first communication channel wherein electronic data is selectively transmitted and a second communication channel wherein re-transmission of extended segments of the electronic data occurs.

12 Claims, 5 Drawing Sheets

MEANS AND METHOD FOR SWITCHING BETWEEN A NARROW BAND COMMUNICATION AND A WIDE BAND COMMUNICATION TO ESTABLISH A CONTINUOUS CONNECTION WITH MOBILE COMPUTERS

FIELD OF THE INVENTION

The present invention relates to maintaining communication between computer systems. More particularly, the present invention relates to maintaining a continuous communication channel between a mobile platform and a server.

BACKGROUND

The increase in battery performance and advances in laptop design has lead to new mobile platforms with lighter design, greater processing power, and longer operational time. Conventional desktop machines are either being replaced with laptops or are often used in tandem with docking stations. Laptops provide mobility of data and allow the user to remotely interact with a stationary corporate server. The popularity of mobile platforms has not, however led to new applications that provide the remote user with greater mobility. Instead, the remote user must still depend on conventional messaging system designed for immobile desktop machines.

Conventional electronic mail ("e-mail") and voice mail systems are oriented towards local users connected to a corporate server. The local user has immediate access to all incoming e-mail and voice mail messages received by the corporate server because the local user's system is directly coupled to the corporate server. Typically, the direct coupling between the local user's system and the corporate server is performed via a local area network ("LAN") or a direct link. Direct connection allows the local user to interact in real time with any communication received by the server. Following the conventional e-mail system a remote user must login into the corporate server and down load, read, or listen to stored messages. Thus, the remote user has to repeatedly login into the server to check for incoming messages.

One disadvantage of conventional e-mail communication exists when a remote user attempts to remain in continuous communication with the corporate server. To ensure continuous communication with a corporate server the remote user requires frequent access to a dedicated line or must rely on a cellular phone line connection via a wide band connection. Access to a dedicated line constrains the remote users mobility because a specified phone jack is desired for communication. A cellular communication does not require a specified phone jack. The cellular connection, however, has a slow data transmission rate, typically advertised as 9600 baud modem rate, when compared to a phone jack/wire connection, typically 33,000 baud rate. Additionally, cellular lines do not provide a stable communication channel and have an average throughput much smaller than the advertised 9600 baud rate. The need to have frequent access to a dedicated phone/cellular line presents a disadvantage to a remote user. Therefore, it would be desirable to replace the conventional communication channel between a corporate server and a mobile platform with a method that allows the remote user to remain in continuous communication without relying on a dedicated phone/cellular line.

Conventional communication between a remote platform and a corporate server also requires multiple accounts. A local account and a remote account is required for a single user. The corporate server forwards the incoming message to a second account. The user, if remote, logs into the second account and checks new e-mail messages. This system presents a disadvantage because account requirements are duplicated. Therefore, it would be desirable to replace the dual account system with a method that uses a single account to pass e-mail messages.

Conventional communication between a remote platform and a corporate server has a further disadvantage of requiring batch communication. Batch communication describes a remote user logging into a corporate server and downloading a group of stored messages. Thus, under batch communication a remote user is unaware of urgent or immediate communications. Further, batch communication typically consist of a large volume of data transmissions because a group of messages is transferred to the remote user for a given period of time (each time a user connects). Transmitting large volumes of data compounds the disadvantages associated with slow baud rate cellular communication and requires longer access to a phone jack, thus reducing mobility.

Regardless of the communications media used, a protocol guaranteeing delivery and integration of messages across a wide variety of messaging system is necessary. This message delivery protocol exists in the prior art. For example, both narrow band communications (typically used in mobile paging systems) and wide band communications transfer outgoing messages to an intermediate protocol that guarantees delivery and integration of messages across a wide variety of messaging system. The industry standard Business Quality Messaging ("BQM") protocol, described in internet site www.bqm.org, provides this intermediate protocol for narrow band communication. Similarly, the industry standard Windows™ Socket Application Programmers Interface ("WinSock") specification version 1.1, available from ftp.microsoft.com provides this intermediate protocol for a wide band communication.

The BQM protocol was developed by a number of companies including Intel Corporation (of Santa Clara, Calif.), Microsoft Corporation (of Redmond, Wash.), International Business Machine ("IBM") Corporation (of Armonk, N.Y.), and Compaq Corporation (of Houston, Tex.) to provide an industry standard guaranteeing compatibility and message delivery between remote systems. Similarly, the WinSock specification defines a standard binary interface for TCP/IP transports with Windows™ specific extensions. WinSock also acts as an interface between programs running on a client and resource available on a server.

Protocols also exist for two way narrow band communication. For example, narrow band devices typically communicate with each other using a two way wireless communication in accordance with Motorola Flex technology developed by Motorola Corporation (of Schaumburg, Ill.) or Mobitex technology developed by Ericsson Corporation (of Stockholm, Sweden). Similarly, protocols also exist for the integration of disparate messaging applications. Typically, the interface between messaging systems is controlled by the Message Application Programmers Interface ("MAPI") developed by Microsoft Corporation (of Redmond, Wash.).

FIG. 1 illustrates a prior art communication between mobile platforms and a server. Laptop 100 includes a cellular device (not shown) communicating with receiver station 130 via cellular antenna 120. Receiver Station 130 in turn communicates with server 160 via phone jack 150. The cellular connection of laptop 100 provides the user great mobility. In contrast, laptop 110 must directly connect to phone jack 140 to communicate with server 160. However, both laptops 100 and 110 must login directly to secondary accounts within server 160 to review incoming messages or down load old messages from server 160. Further, once disconnected from server 160 laptops 100 and 110 are unaware of incoming messages, thus creating the disadvantages described above.

SUMMARY OF THE INVENTION

A computer-implemented method for maintaining a continuous communication channel between a first device and a second device is described. The method includes opening a first communication channel between the first device and the second device. The method also includes selectively transmitting a first set of electronic data along the first communication channel and opening a second communication channel between the first device and the second device. The second communication channel is used to selectively re-transmit a second set of electronic data, wherein the second set of electronic data comprises an extended transmission of a subset of the first set of electronic data.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

Figure 1:
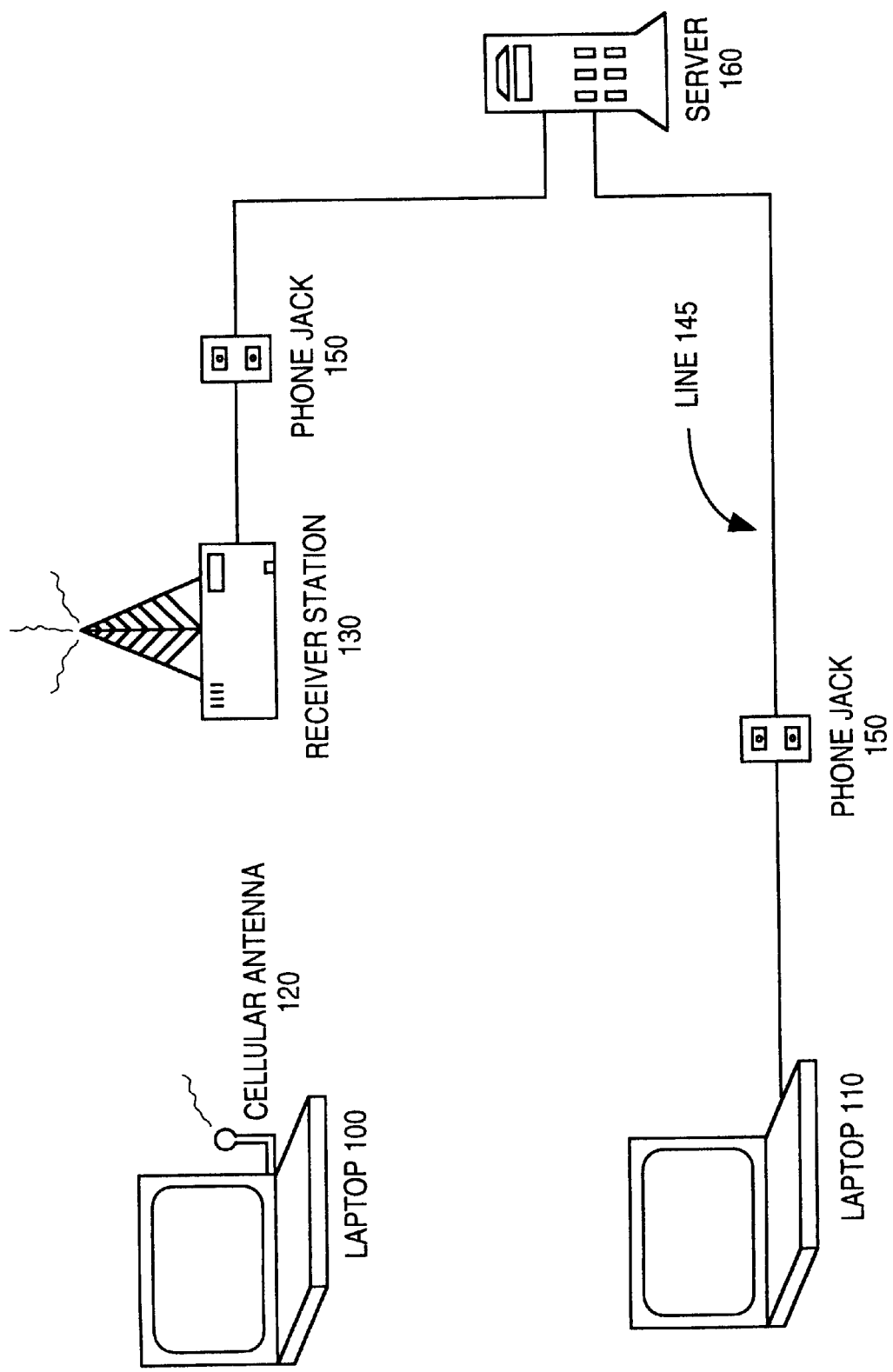
FIG. 1 illustrates prior art mobile platforms directly coupled to a server.

A method including a communication between a mobile platform and a local server is disclosed. The communication is governed via a software agent consisting of two parts—namely, a local agent located on the local server and a client agent located on the mobile platform. The local agent filters incoming messages to the local server and is responsible for re-transmitting the incoming messages to the mobile platform. The filtering process is dependent on defined parameters that govern the communication between the local server and the mobile platform. For one embodiment, the filtering process is determined by a user profile inputted to the local server. Using the filtering process the local agent re-transmits an entire or partial messages to the mobile platform, thus allowing for continuous communication. This process is described as "pushing messages." For one embodiment, a narrow band socket communication between the local server and the mobile platform provides for real time updates of incoming messages.

The client agent provides for seamless communication between the mobile platform and the local server. In particular, when a partially transmitted message is selected the client agent retrieves the un-transmitted sections of the message. This process is described as "pulling messages." For one embodiment, the retrieval of un-transmitted sections of a message are conducted along a wide band communication channel. A wide band communication channel describes transmission using a dedicated land line or cellular devices. For one embodiment the client agent dynamically switches between narrow band and wide band communication to receive filtered or un-filtered messages.

Both narrow band and wide band communications transfer outgoing messages to an intermediate protocol that guarantees delivery and integration of messages across a wide variety of messaging system. For one embodiment, the industry standards BQM and WinSock provide this intermediate protocol.

An intended advantage of an embodiment of the invention is to provide continuous communication between a local server and a mobile platform. The local agent selectively transmits segments of an incoming message to the mobile platform. Additionally, the client agent allows the user to review the messages as transmitted or in their entirety. Thus, the constraints on mobility and bandwidth imposed by batch communication are removed by the present invention.

Another intended advantage of an embodiment of the invention is to reduce the number of remote accounts on a local server. The software agent provides for the automatic pushing and pulling of incoming messages from a single account, instead of requiring a secondary account to access new messages.

Another intended advantage of an embodiment of the invention is to reduce power consumption in a mobile platform. Power consumption is preserved by allowing the software agent to communicate via a narrow band device, thus allowing for continuous communication while the mobile platform is turned off or in power conservation mode. Power conservation mode is known in the art and consists of shutting down components of computer system to increase battery life.

Figure 2:
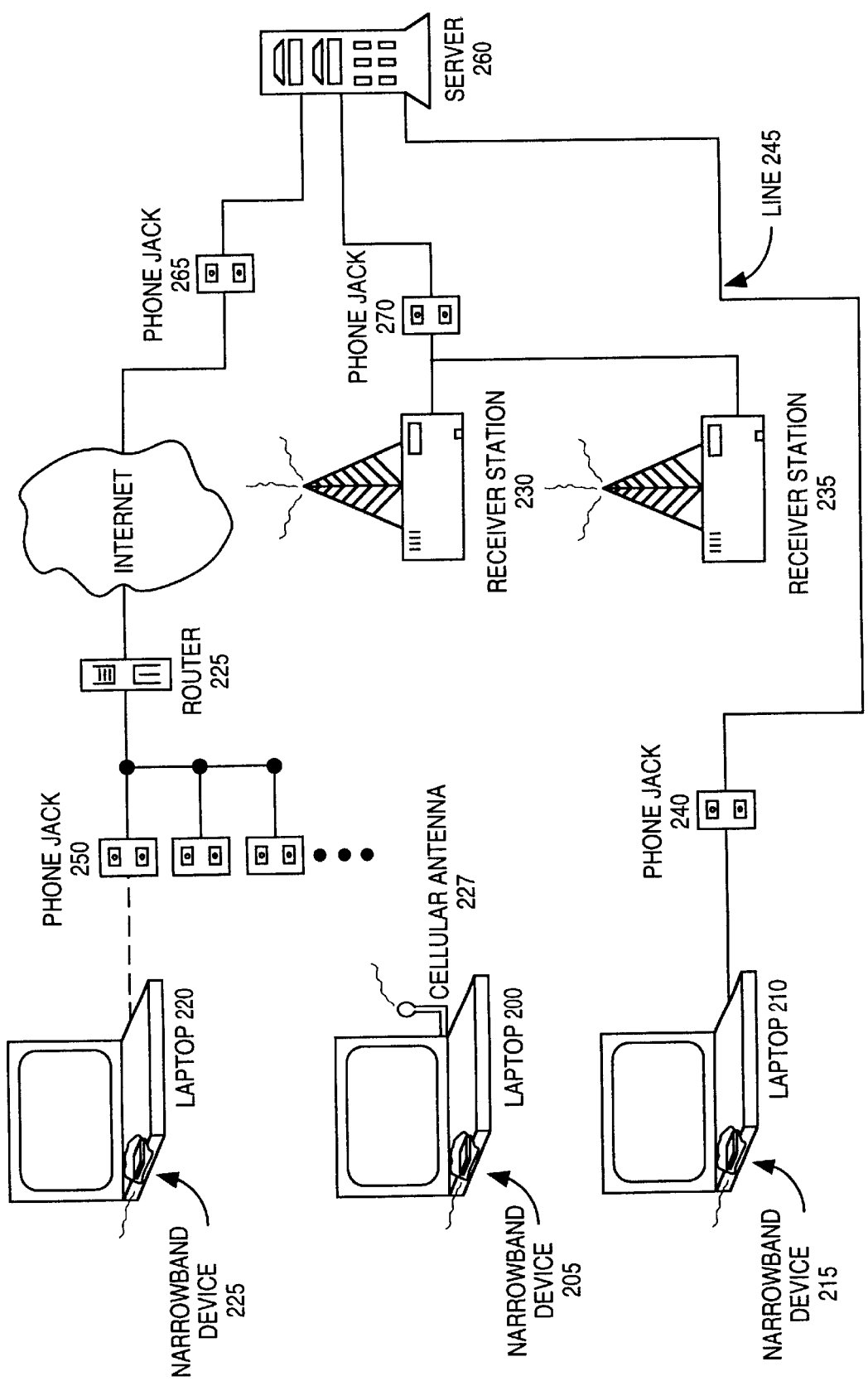
FIG. 2 shows one embodiment of mobile platforms coupled to a server.

FIG. 2 illustrates one embodiment of the present invention. Laptops 200, 210, and 220 are coupled to server 260 via different communication medias. Server 260 includes a processor and an execution unit (not shown) for executing instructions of a software agent. Laptops 200, 210, and 220 also include processors and execution units (not shown) for executing the instructions of a software agent. Additionally, each laptop include narrow band devices 205, 215, and 225 respectively. The narrow band devices communicate with receiver station 230 via a narrow band communication channel. Receiver Station 230 in turn is coupled to server 260, thus providing narrow band devices 205, 215, and 225 with a narrow band connection to server 260. The narrow band communication with server 260 occurs independent of the laptops location or power mode, thus providing a continuous communication channel. For one embodiment, the narrow band devices communicate with receiver station 230 using a two way wireless pager narrow band socket connection in accordance with Motorola Flex technology. For an alternative embodiment, the narrow band devices communicate with receiver station 230 using a two way wireless pager narrow band socket connection in accordance with Mobitex technology.

Server 260 includes a local agent that determines whether new messages should be re-transmitted to mobile platforms. The local agent also determines the structure of each re-transmitted message for a given mobile platform. Accordingly, using the local agent server 260 updates laptops 200, 210, and 220 with new messages or segments of new messages using the narrow band connection regardless of the laptops location or power mode. Additionally, laptops 200, 210, and 220 include a client agent (not shown). The client agent maintains the re-transmitted messages and dynamically switches between the narrow band connection and a wide band connection to receive entire messages when a partially transmitted message is selected by a user.

Laptop 200 includes a cellular device (not shown) communicating with receiver station 235 through cellular antenna 227. Receiver Station 235 in turn transmits messages to and from server 260 via phone jack 270. The cellular connection of laptop 200 provides the user great mobility. Accordingly, laptop 200 receives new messages through batch communication. Laptop 200's narrow band device 205 and client agent allow laptop 200 to continuously receive incoming messages from server 260, via receiver station 230, without the cellular connection or the constraints of batch communication.

Laptop 210 is coupled to phone jack 240 which in turn is coupled to server 260 along dedicated line 245. Dedicated line 245 allows laptop 210 a faster communication media than the cellular connection of laptop 200, however the need for a dedicated line reduces the mobility of laptop 210. The narrow band device 215 and laptop 210's client agent allows laptop 210 to detach from the dedicated line and continuously receive incoming messages from server 260, thus affording laptop 210 with greater mobility.

Similar to laptop 210, laptop 220 communicates with server 260 directly. Instead of using a dedicated communication line laptop 220 uses router 255 and an internet connection to communicate with server 260. Accordingly, laptop 220 couples to different phone jacks and still communicates with server 260, thus providing laptop 220 with greater mobility. However, laptops 220's client agent and narrow band device 225 allows laptop to receive incoming messages without relying on connection to a phone jack, thus further increasing the mobility of laptop 220 while maintaining continuous connectivity.

Figure 3:
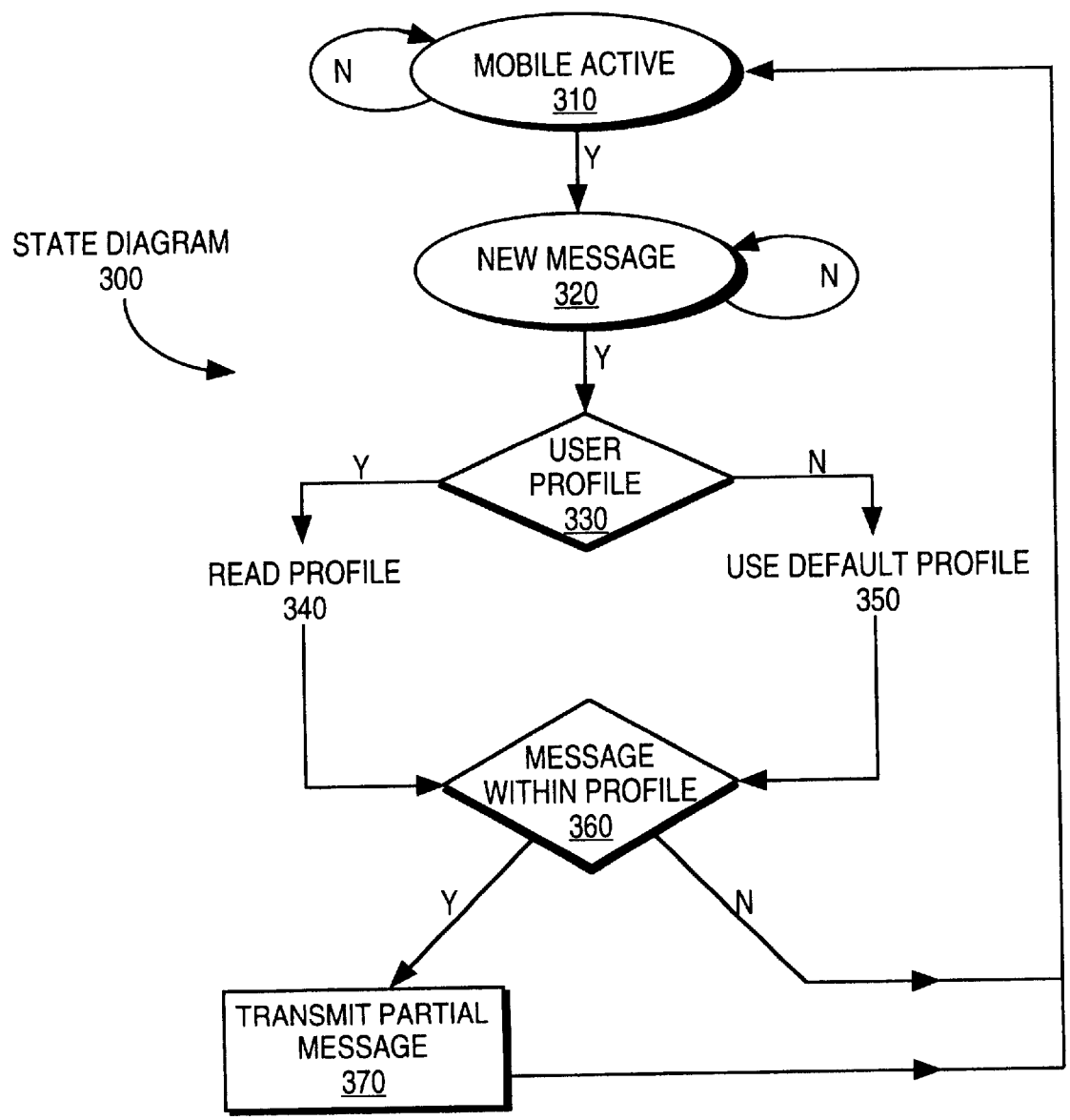
FIG. 3 shows one embodiment of a state machine diagram for implementing a narrow band communication between a mobile platform and a server.

FIG. 3 illustrates one embodiment of the state transitions within a local agent of server 260. State diagram 300 describes decision transitions, states 310 through 370, followed by the local agent. In State 310, the local agent determines whether the mobile active has been activated for a local account. For one embodiment, the mobile active is manually activated when the user leaves the LAN coordinated by server 260. When mobile active is turned on a transition to State 320 occurs. In State 320, the local agent logs into server 260 and periodically interrogates server 260 for new messages. For one embodiment, the local agent uses the MAPI application to login and interrogate server 260.

A new message causes a transition to State 330. In State 330, the local agent determines whether a user profile is set within server 260. Existence of a user profile leads to State 340 wherein the profile is used to configure message re-transmission. If no user profile exists a default profile is used in State 350. The user profile includes a set of preprogrammed rules describing whether a message will be re-transmitted across the narrow band socket communication. The user profile also includes the desired length and contents of re-transmitted messages. For one embodiment, a user profile only re-transmits the first one hundred lines of new messages marked as urgent in their header. For an alternative embodiment, the user profile only requires re-transmission of messages header information.

In State 360, the local agent determines whether the new message follows the characteristics determined by the user profile, State 340, or the default profile, State 350. If the message does not fall within the user profile the local agent returns to state 310. Provided the message follows the selected profile the local agent transitions to State 370. In State 370, the message or selected segments of the message are re-transmitted to the narrow band device included in the user's mobile platform. Subsequent to message re-transmission the local agent returns to state 310. For one embodiment, in State 370 the message or a segment of the message is passed to a BQM protocol for re-transmission.

Figure 4:
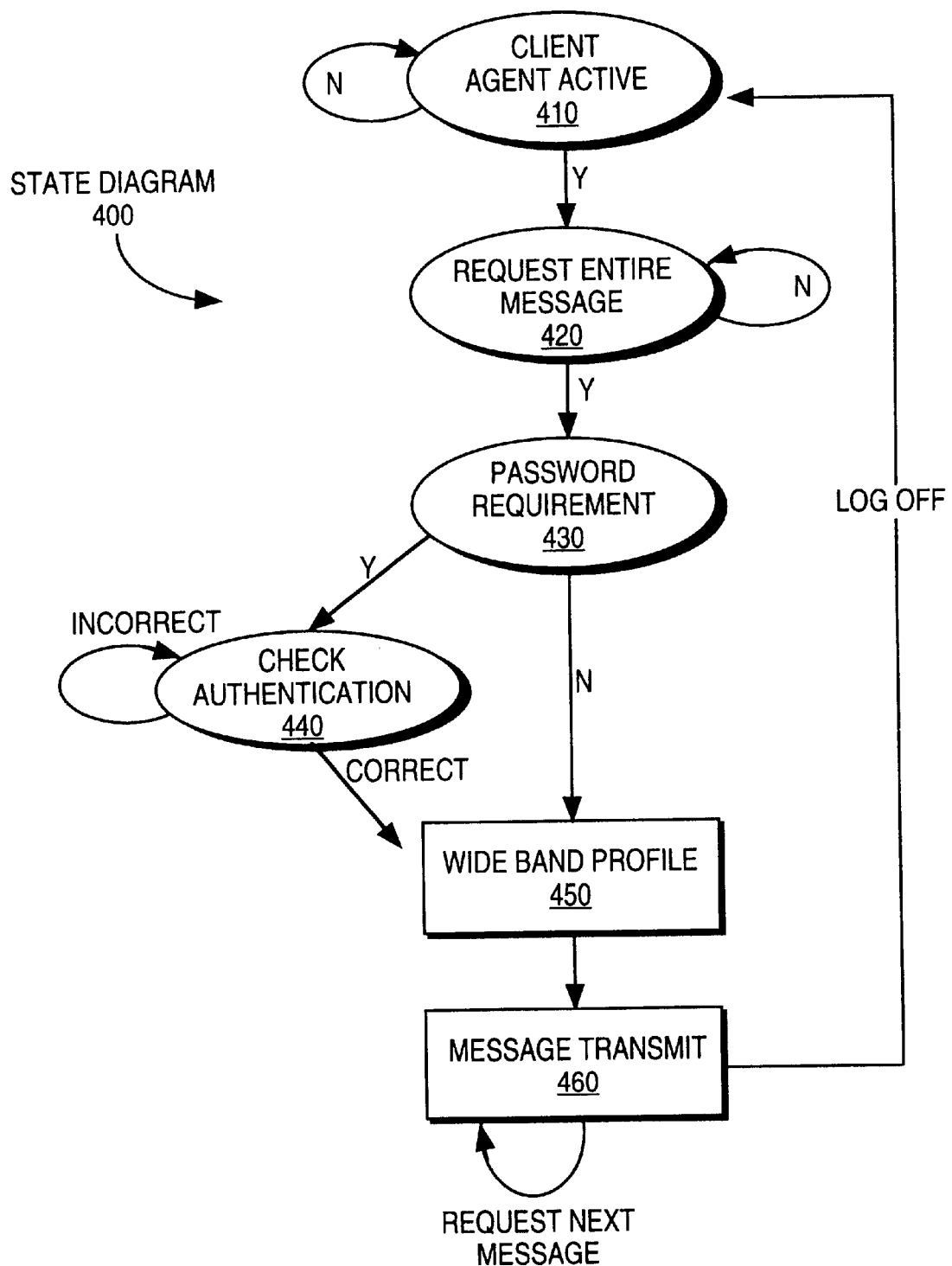
FIG. 4 shows one embodiment of a state machine diagram for implementing a wide band communication between a mobile platform and a server.

FIG. 4 illustrates one embodiment of the state transitions within a client agent of a mobile platform. State diagram 400 describes the decision transitions followed by the client agent subsequent to message reception by a narrow band device. For one embodiment, all communication between the client agent and the local agent is governed by the WinSock specification.

In State 410, the client agent is activated. For one embodiment, the client agent is activated when the user accesses an electronic mail program included in the mobile platform. Activation of the client agent results in a transition to State 420. In state 420 the client agent interrogates the electronic mail program included in the mobile platform to determine whether the user is accessing received messages. For one embodiment, the client agent interrogates the electronic mail program using MAPI. When the user is accessing a message that was transmitted in the entirety the client agent remains in State 420. However, provided the user is attempting to access a partially transmitted message, the client agent transitions to State 430.

In State 430, the client agent logs into server 260. A server without an authentication requirement results in a direct transition to State 450. A server with a password requirement however leads to a transition to State 440, wherein server 260 requests authentication subsequent to entire message transmission. For one embodiment, the authentication is a user inputted password. For alternative embodiments, the authentication is determined on equipment keys correlating to the clients remote machine, voice recognition, and/or visual recognition.

In State 440, the client agent transmits the appropriate authentication credential and provided the authentication credential is accepted by server 260 the client agent transitions to State 450, wherein wide band communication is initiated. For one embodiment, wide band communication is initiated when the client agent selects an available wide band communication device and transmits an acknowledge signal to server 260. For an alternative embodiment, the local agent includes a secondary user profile that regulates the length and content of messages re-transmitted to the user over the wide band communication media.

In State 460, the entire message is transmitted to the mobile platform from server 260. When the user has completed accessing received messages the client agent returns to State 410 otherwise the client agent returns to State 460. For one embodiment, return to State 410 is initiated by the user exiting the electronic mail program included in the mobile platform. For an alternative embodiment, return to State 410 is initiated at the end of each message transmission.

The transition from States 430 to 460 are performed seamlessly. However, for an alternative embodiment the client agent queries the user prior to a state transition. For one embodiment, server 260's password, the media for wide band transmission, and whether the user wants the entire contents of a partially transmitted message is requested prior to state transitions from 430 to 460.

State Diagram 400 describes the processing of re-transmitted messages received and stored within a narrow band device for one embodiment. For alternative embodiments, the narrow band devices store received messages within the memory devices of the mobile platform.

Figure 5:
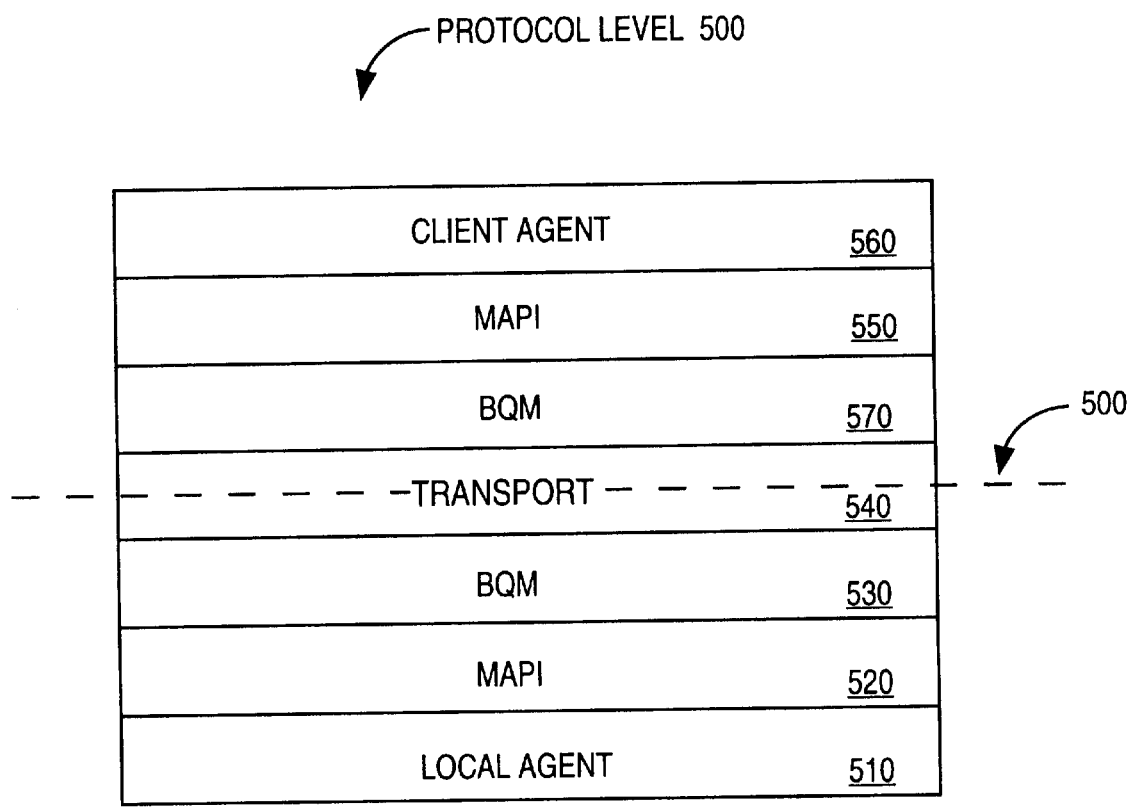
FIG. 5 shows one embodiment of interface levels shared between a mobile platform and a server.

FIG. 5 illustrates one embodiment of the protocol levels between the two components of the software agent, Client Agent 560 and Local Agent 510. Protocol Level 500 describes the interaction of each protocol level.

Local Agent 510 is located on server 260. Local Agent 510 filters incoming messages to server 260 and is responsible for re-transmitting the incoming messages to a mobile platform. Local Agent 510 uses the MAPI 520 protocol to interrogate and communicate with the mail system of server 260. Once a new message has been restructured for re-transmission to the mobile platform the reconstructed message is transferred to a BQM 530 protocol. Local Agent 510 uses the BQM 530 protocol to guarantee the transmission of messages between server 260 and a BQM 570 protocol on the mobile platform.

On the mobile platform, Client Agent 560 provides for seamless communication between the mobile platform and the local server. Using the MAPI 550 protocol Client Agent 560 communicates with the electronic mail program included in the mobile platform. Accordingly, Client Agent 560 is able to determined whether a user is accessing partially transmitted messages. Access of a partially transmitted message results in Client Agent 560 opening a wide band communication channel with server 260. The wide band communication between the mobile platform and server 260 is facilitated by the Transport 540 protocol. The Transport 540 protocol provides a channel connection between Client Agent 560 and Local Agent 510. For one embodiment, the Transport 540 protocol consists of the Microsoft WinSock socket based services that interfaces between applications and a channel connection between two platforms. For an alternative embodiment, the Transport 540 protocol consists of the TCP/IP protocol.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A computer-implemented method for maintaining a continuous communication channel between a first device and a mobile device, said computer-implemented method comprising:

opening a narrow band communication channel between said first device and said mobile device, wherein said narrow band communication channel is operable to transmit electronic data available on said first device;

selectively transmitting a first sub-set of said electronic data along said narrow band communication channel;

opening a wide band communication channel between said first device and said mobile device, wherein said wide band communication is opened in response to a signal from said mobile device; and selectively transmitting a second sub-set of said electronic data along said wide band communication channel, wherein said second sub-set of electronic data comprises an extended transmission of said first sub-set of electronic data.

2. The computer-implemented method as described in claim 1 wherein said narrow band communication channel comprises a wireless connection.

3. The computer-implemented method as described in claim 2 wherein the first device comprises a server.

4. The computer-implemented method as described in claim 3 wherein selectively transmitting said first sub-set of electronic data comprises following a first set of predefined rules to determine the content of said first sub-set of electronic data.

5. The computer-implemented method as described in claim 4 wherein said electronic data comprises an electronic message.

6. The computer-implemented method as described in claim 5 wherein selectively transmitting said second sub-set of electronic data comprises following a second set of predefined rules to determine the content of said second sub-set of electronic data.

7. A computer-readable medium having stored thereon a plurality of sequence instructions, the plurality of sequences of instructions including sequences of instructions which, when executed by a first processor of a first device and a second processor of a second device, cause the processors to perform the steps of:

opening a narrow band communication channel between said first device and said mobile device, wherein said narrow band communication channel is operable to transmit electronic data available on said first device;

selectively transmitting a first sub-set of said electronic data along said narrow band communication channel;

opening a wide band communication channel between said first device and said mobile device, wherein said wide band communication is opened in response to a signal from said mobile device; and selectively transmitting a second sub-set of said electronic data along said wide band communication channel, wherein said second sub-set of electronic data comprises an extended transmission of said first sub-set of electronic data.

8. The computer-readable medium as described in claim 7 wherein said narrow band communication channel comprises a wireless connection.

9. The computer-readable medium as described in claim 8 wherein the first device comprises a server.

10. The computer-readable medium as described in claim 9 wherein the step of selectively transmitting said first sub-set of electronic data comprises following a first set of predefined rules to determine the content of said first sub-set of electronic data.

11. The computer-readable medium as described in claim 10 wherein said electronic data comprises an electronic message.

12. The computer-readable medium as described in claim 11 wherein the step of selectively transmitting said second sub-set of electronic data comprises following a second set of predefined rules to determine the content of said second sub-set of electronic data.

* * * * *